US006484413B1

(12) United States Patent
Larsson

(10) Patent No.: US 6,484,413 B1
(45) Date of Patent: Nov. 26, 2002

(54) CARTRIDGE FOR AN AIR DRIER

(75) Inventor: Sven-Olof Larsson, Landskrona (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 09/658,255

(22) Filed: Sep. 8, 2000

Related U.S. Application Data

(63) Continuation of application No. PCT/SE99/00400, filed on Mar. 16, 1999.

(51) Int. Cl.[7] ................................................ F26B 21/06

(52) U.S. Cl. ....................... 34/80; 34/73; 34/76; 34/79; 96/149; 96/151

(58) Field of Search ................................ 34/72, 73, 74, 34/76, 79, 80; 96/108, 147, 149, 151

(56) References Cited

U.S. PATENT DOCUMENTS 5,785,742 A * 7/1998 Mitsch ........................ 96/144

* cited by examiner

*Primary Examiner*—Ira S. Lazarus
*Assistant Examiner*—Kathryn S. O'Malley
(74) *Attorney, Agent, or Firm*—St. Onge Steward Johnston & Reens LLC

(57) ABSTRACT

An air drier comprises a base member with means for supplying and carrying away air to and from the air drier, respectively, a cylindrical, dome-shaped container releasably attached to the base member, and in the container a replaceable cartridge for desiccant. The cartridge is divided by a cylindrical dividing wall into a central compartment containing desiccant and an outer annular compartment. The top wall of the cartridge is provided with holes or passages for allowing air communication inside the container between the two compartments.

9 Claims, 5 Drawing Sheets

CARTRIDGE FOR AN AIR DRIER

Figure 1:
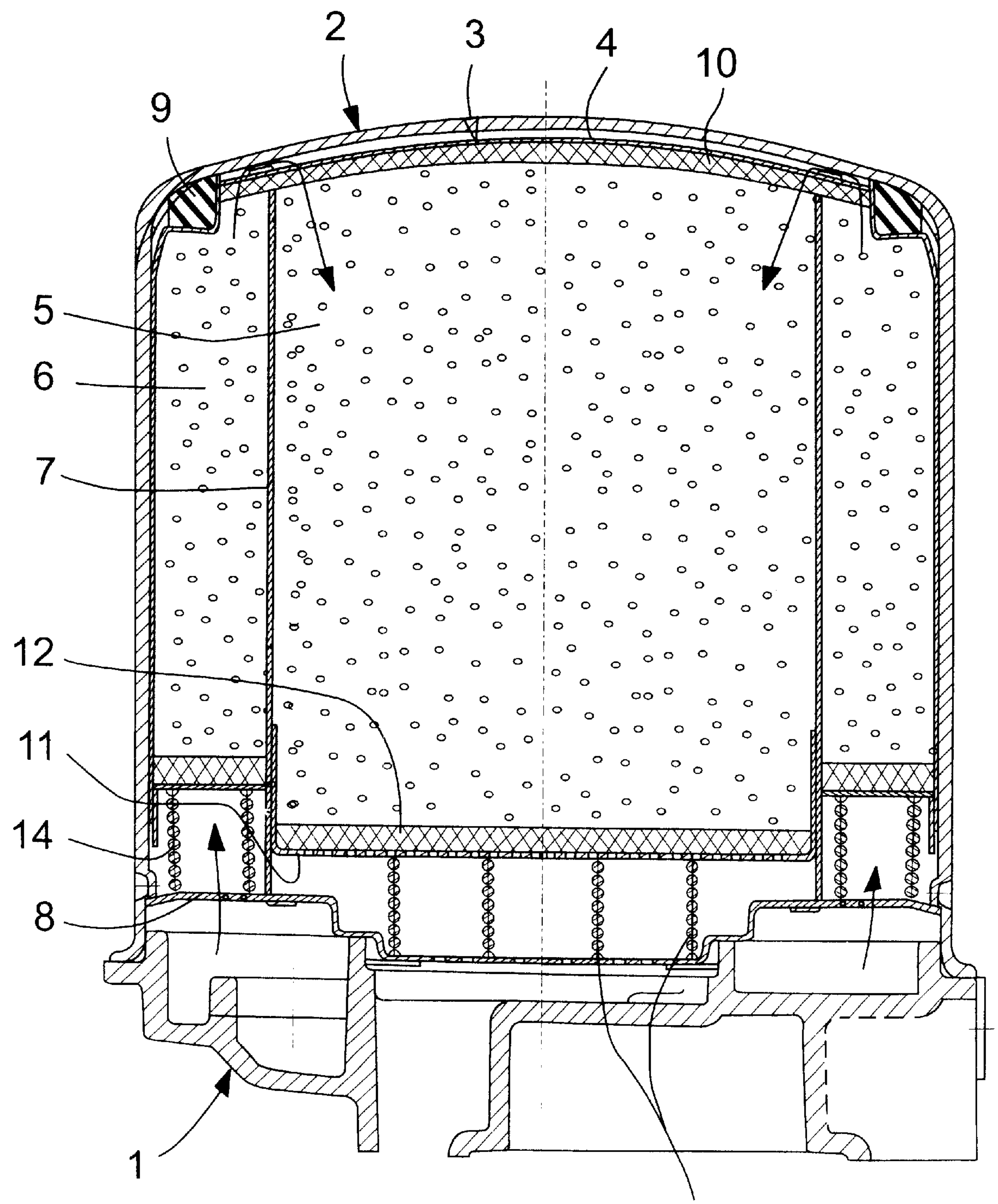

This is a continuation of pending International Application PCT/SE99/00400 filed Mar. 16, 1999, which designates the United States.

TECHNICAL FIELD

The present invention relates to a replaceable cartridge for an air drier, the air drier comprising a base member with means for supplying and carrying away air to and from, respectively, a cylindrical dome-shaped container, releasably attached to the base member and containing the cartridge for desiccant, which is divided by a cylindrical dividing wall into a central compartment containing desiccant and an outer annular compartment.

BACKGROUND OF THE INVENTION

Air driers of this type are known in the art. In many cases it is desired to obtain a long flow path for the air to be dried through the desiccant, at the same time as the total volume of the cartridge shall be utilized for desiccant, so that the capacity is as great as possible. For such cases a winding path or labyrinth for the air can be provided. In other cases it may be desired to have a combination of filter material and desiccant in the cartridge; the filter material has the purpose of removing other matters, such as dirt particles, hydrocarbons and oil, that can be detrimental to the desiccant, the only purpose of which is to catch water molecules.

It is also a desire to obtain a versatile cartridge, which can be used for different purposes and combinations of desiccants and filters, for obtaining advantages with regard to manufacturing and storing.

Further, the design shall allow the greatest possible air flow and temperature.

THE INVENTION

The objects mentioned above are fulfilled and problems with prior designs are removed if according to the invention the cartridge is provided at its top end with means for allowing air communication inside the container between the two compartments and at its bottom end with means for allowing supply of air to either of the compartments and removal of air from the other of the compartments.

Normally, the air to be treated is supplied first through the outer compartment and then to the central compartment through said holes or passages in the cartridge top wall, but the opposite flow direction is also possible. The design is such that the two compartments are physically separated but are in pneumatical contact (at least when the cartridge is mounted in its container). The two compartments have to be separately filled with suitable contents. The central compartment always contains desiccant, whereas there is full freedom to choose contents in the outer compartment depending on the purpose of the air drier. The outer compartment thus can be completely filled with desiccant, if a maximum drying capacity is needed. In other cases the outer compartment can for example contain a filter together with desiccant or only a filter.

The outer compartment can even be left without any content. In that case the flow direction may be reversed, and the outer compartment can be used as a regeneration container for dried air.

The physical separation of the two compartments means that they have to be filled separately (with for example desiccant and filters in different combinations). The useful life of the relatively sensitive desiccant can hereby be increased, and furthermore the desiccant can be protected against harmful influence of oil, particles and hydrocarbons.

THE DRAWINGS

Figure 3:
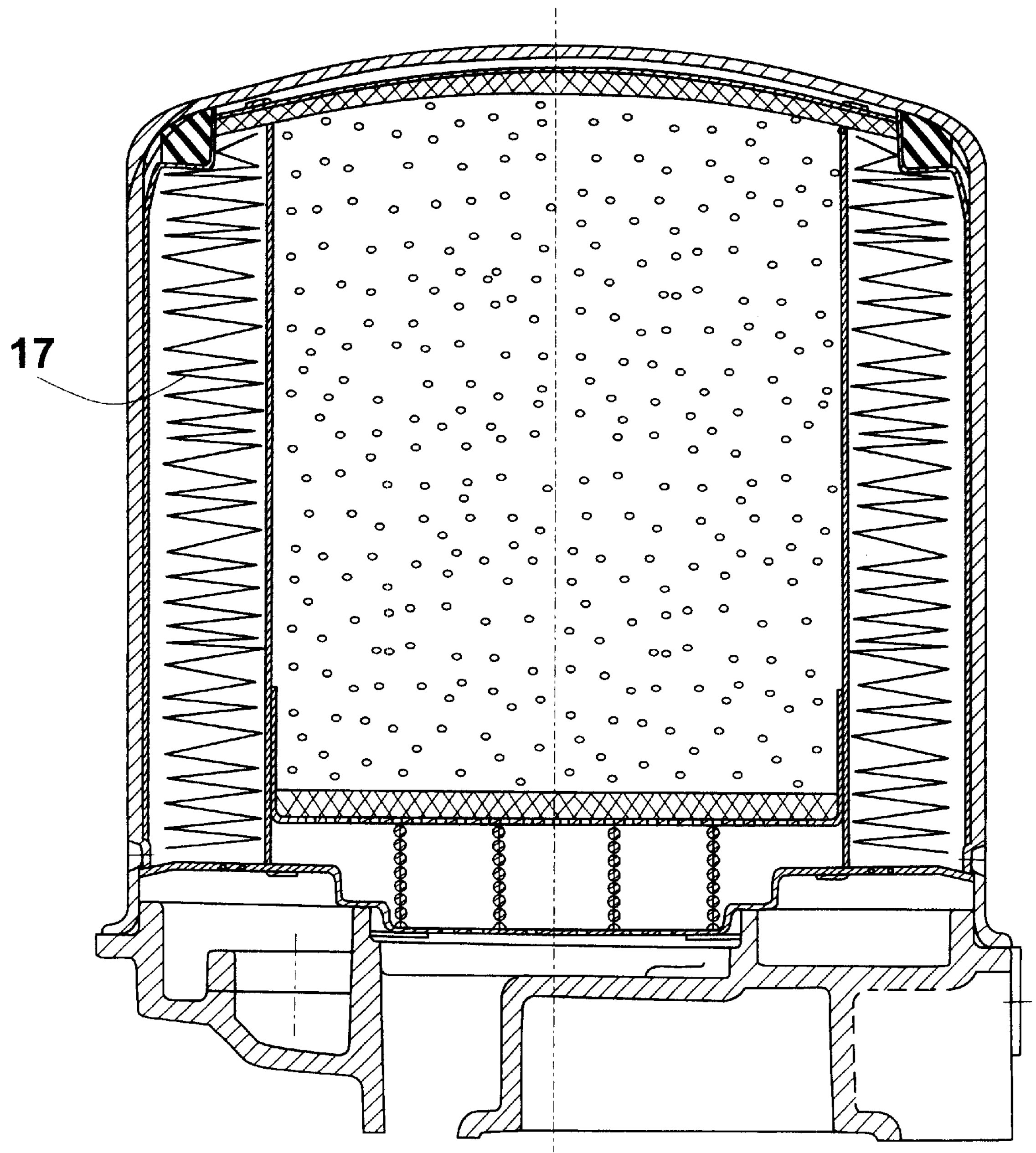
Figure 4:
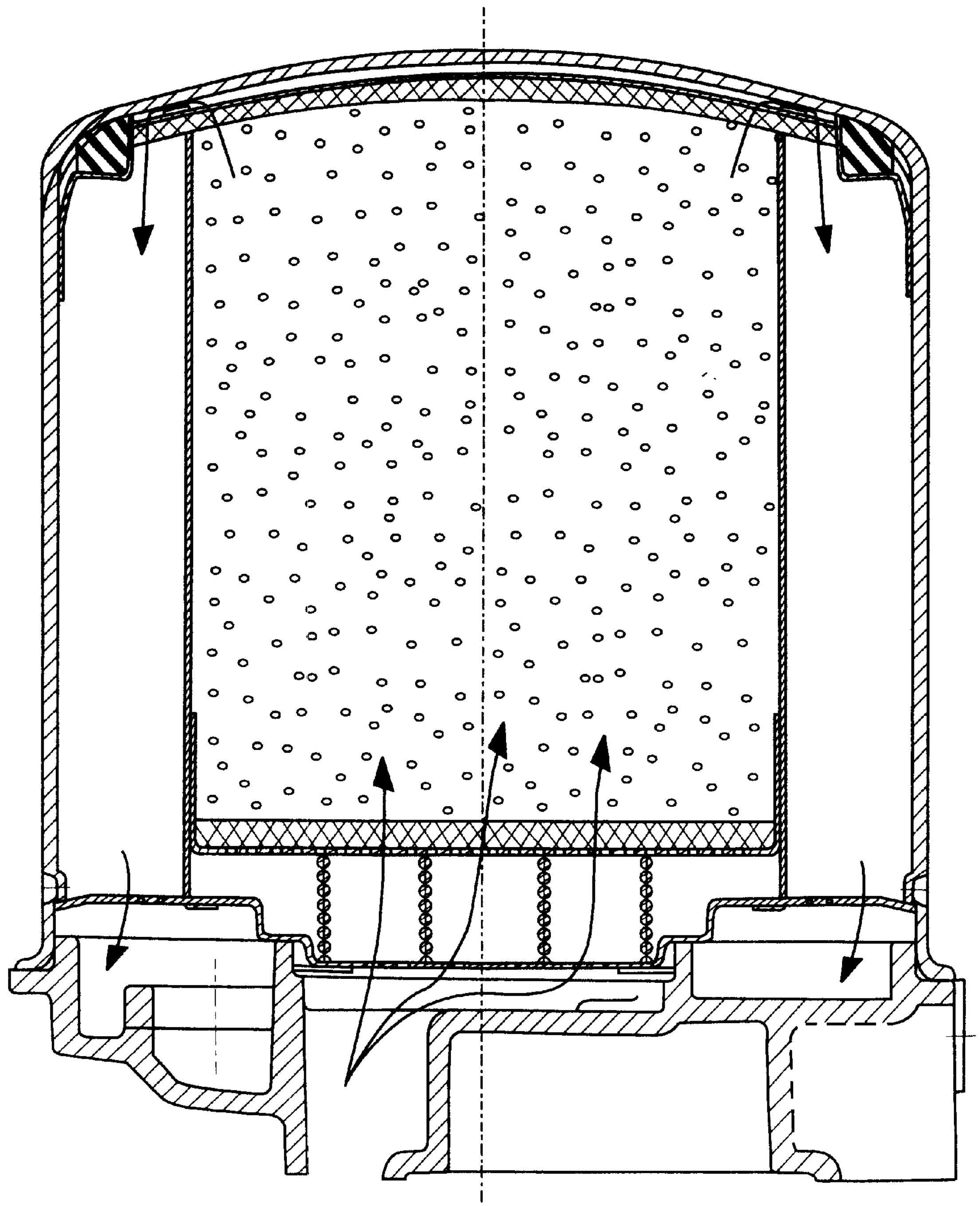
Figure 5:
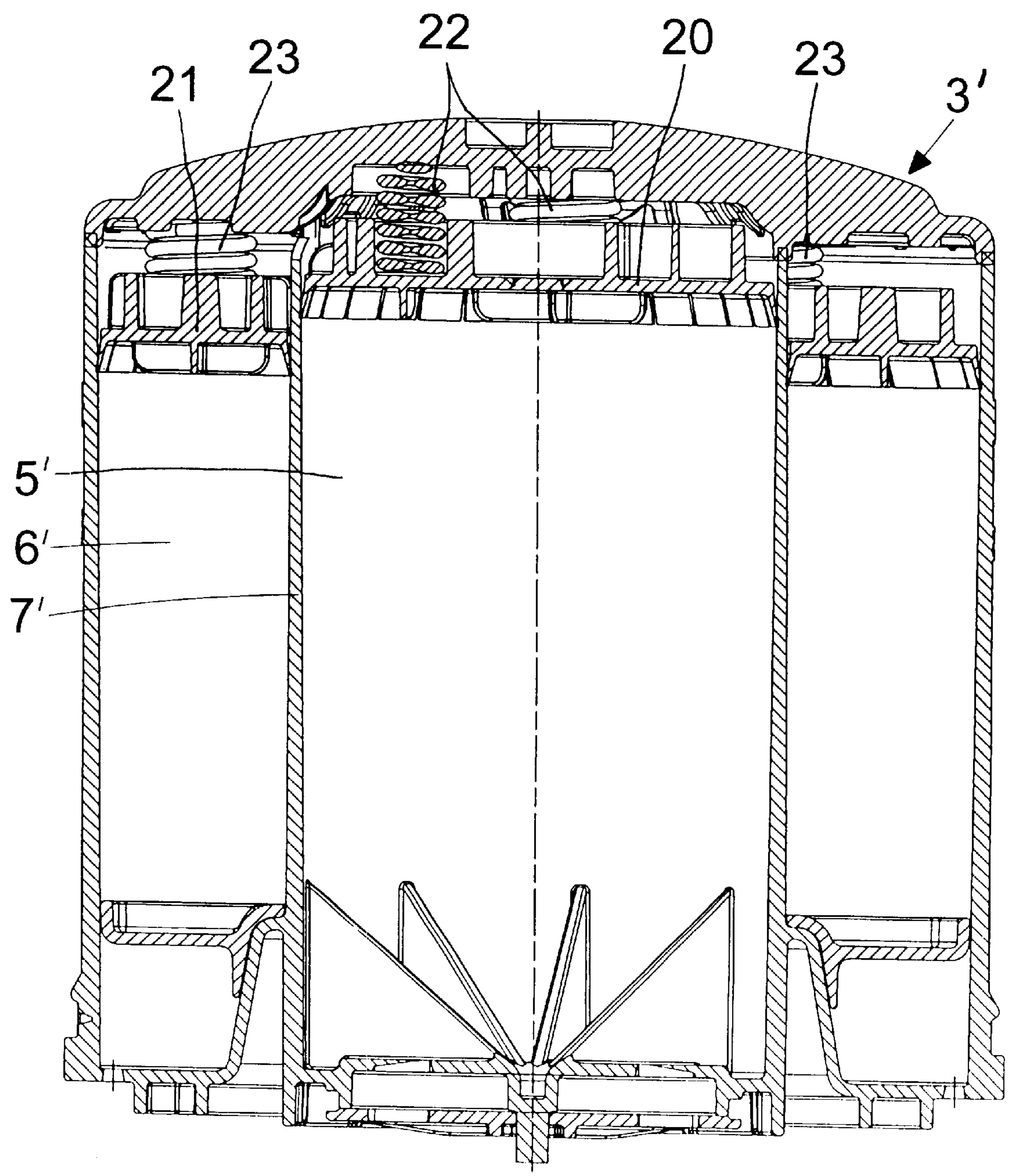

The invention will be described in further detail below under reference to the accompanying drawings, in which FIGS. 1–4 are cross-sectional views of four embodiments of a cartridge according to the invention in an air drier and FIG. 5 is a cross-sectional view of a fifth and preferred embodiment, where only the cartridge is shown.

DETAILED DESCRIPTION OF EMBODIMENTS

Only such portions of an air drier that are relevant for a proper understanding of the invention are shown in the drawings.

Reference is first made to FIGS. 1–4.

An air drier basically consists of a base member 1, a container 2 attached to the base member, and a cartridge 3 removably arranged in the container 2. The base member 1 and the container 2 may be common for the four different embodiments shown in FIGS. 1–4. This is also basically true for the cartridge 3, although minor practical differences depending on the intended purpose can be noted, as appears below.

Figure 2:
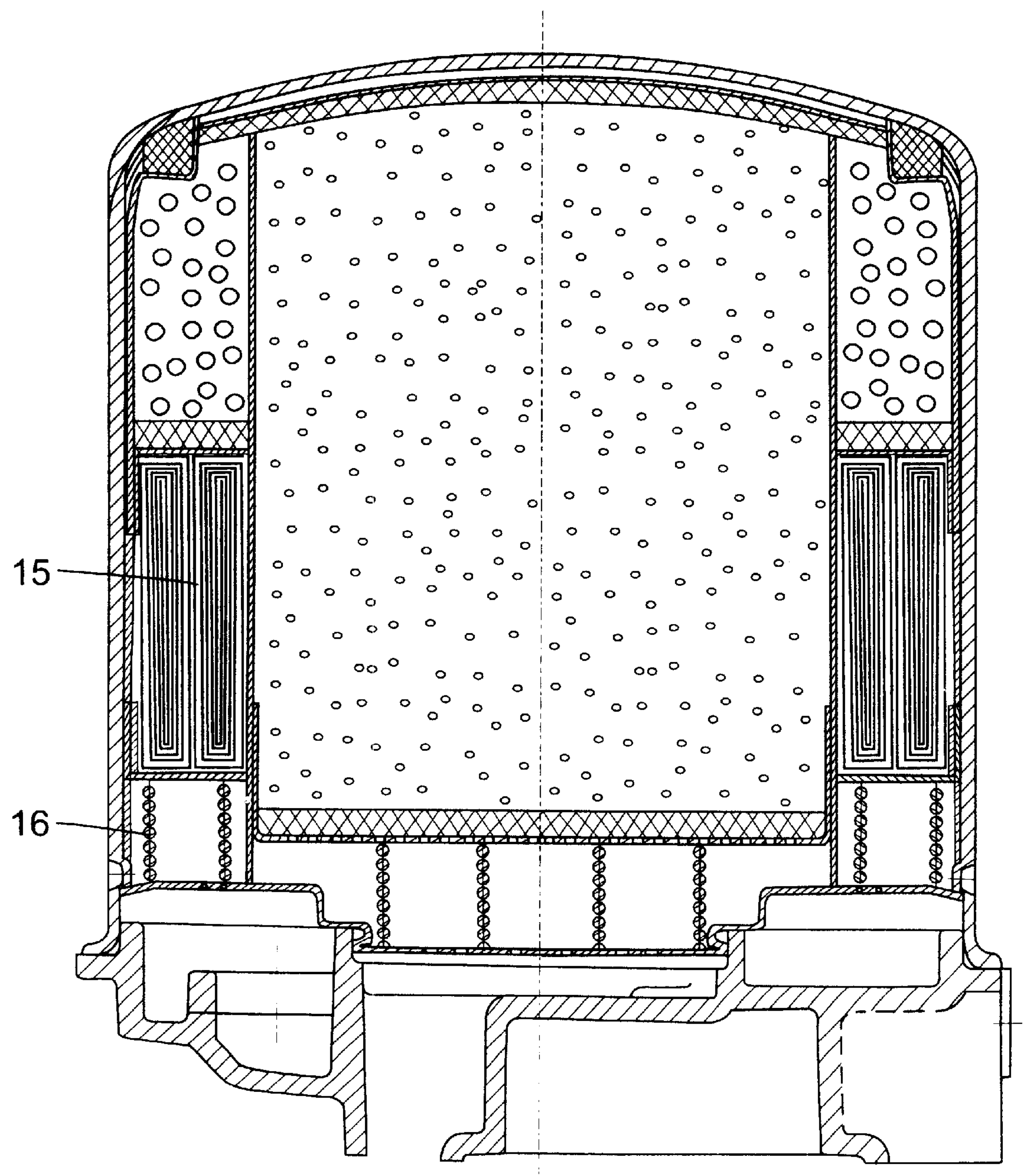

The base member 1 contains means for supplying air to be dried and/or cleaned to the cartridge 3 and means for carrying away dried and/or cleaned air therefrom. The usual conveying direction for the air, common for the three embodiments according to FIGS. 1–3, is indicated by arrows in FIG. 1. The base member 1 may also—as is well known in the art—contain valve means and the like for governing the function of the air drier.

The container 2 is usually a deep-drawn pressure vessel in a cylindrical shape and is releasably attached to the base member 1 in a conventional way.

The outer diameter of the cartridge 3 corresponds to the inner diameter of the container 2 in such a way that the cartridge 3 easily can be removed from or inserted in the container 2 without the use of any special tool. At the end remote from the base member 1 or the top end there is left a certain space between the container 2 and the top wall 4 of the cartridge 3 for air to pass in a way to be described below.

The cartridge 3 is basically divided into two compartments 5 and 6 by a cylindrical dividing wall 7 extending all the way from the bottom of the cartridge 3 (at the base member 1) to its top wall 4. Thus formed are a central cylindrical compartment 5 and outside thereof an annular outer compartment 6. The dimensioning can be such that the volumes of the two compartments correspond to each other, namely in a practical case about 1 litre.

The cartridge 3 has a bottom 8 provided with appropriate passsages for air to pass into and out of the cartridge.

A sealing ring 9 for sealing the space between the container 2 and the cartridge top wall 4 is provided in a peripheral notch therefore in the cartridge 3.

The cartridge top wall 4 is provided with holes or passages for enabling air to pass between the two compartments 5 and 6 above the top wall 4. A layer 10 of air permeable textile material or the like may be provided under the cartridge top wall 4.

The central compartment 5 contains a desiccant for drying air, as is well known in the art. The desiccant is supported by a bottom sleeve 11 having air passages and being provided with a layer 12 of air permeable textile material or the like. The sleeve 11 is movable against the dividing wall 7 and is biassed upwards by means of compression springs 13 between the bottom 8 and the sleeve 11 so as to keep the desiccant reasonably compressed.

So far the description is common for all the embodiments shown in FIGS. 1–4. For the sake of clarity only FIG. 1 is provided with the above reference numerals.

In the first embodiment according to FIG. 1 not only the central compartment 5 but also the outer compartment 6 is filled with desiccant sieve. In a similar way as with the central compartment 5 the desiccant in the outer compartment 6 is reasonably compressed by compression springs 14.

The air will in this case flow in desiccant through the outer compartment 6, up in the space above the cartridge 3 and down through the central compartment 5. The volume in the cartridge is substantially filled with desiccant, so that a maximum drying capacity for air can be obtained. This embodiment can thus be regarded as being intended for "heavy duty" service.

If needed, a water separator and/or a filter for particulate material or oil will have to be provided elsewhere.

In the embodiment according to FIG. 2 the central compartment 5 is—as said—filled with desiccant. In the outer compartment 6 the air—flowing in the same direction as in the FIG. 1 embodiment—will first pass through a filter 15 and then through desiccant up to the cartridge top wall 4. This desiccant can if desired be of another quality than the desiccant in the central compartment for adsorption of molecules other than water, for example oil molecules, that can be harmful for the desiccant in the central compartment. Compression springs 16 under the filter 15 are also in this case arranged to keep the desiccant reasonably compressed.

In the embodiment according to FIG. 3 the central compartment 5 is filled with desiccant. The outer compartment 6 is entirely filled with a filter 17, through which the air will pass and become clean, before it enters the desiccant in the central compartment.

The fourth embodiment according to FIG. 4 is slightly different. This embodiment is especially well suited for vehicles with a lower air consumption, for example light lorries with a so called air-over-hydraulic brake system. In this embodiment the air flow direction is preferably opposite to the one shown in FIG. 1, namely first through the central compartment with the desiccant and then through the outer compartment, as is illustrated by arrows in FIG. 4. The outer compartment is free from any desiccant or filter and may function as a regeneration container, so that a separate container for that purpose may be omitted. A non-return valve with feedback is to be fitted in the top wall 4. The pressure on the inner compartment during the regeneration will be significant and may lead to an implosion, unless the wall thickness of the central compartment is sufficient or other design measures are taken.

In FIG. 5 a preferred embodiment of a cartridge is shown. For corresponding parts the same reference numerals as in FIG. 1 with the addition of a prime sign are used.

The cartridge 3' of FIG. 5 is to be arranged on a base member 1 and in a container 2 of the same general kind as shown in FIG. 1 (as well as in FIGS. 2–4).

The cylindrical cartridge 3' is divided into two compartments 5' and 6' by a cylindrical dividing wall 7'. The central cylindrical compartment 5' may have a volume corresponding to that of the outer annular compartment 6', but other proportions are possible. In the preferred embodiment the volume proportion between the outer and the central compartments is 2.4:1.

Provisions are made to allow air into and out of the two compartments in the lower region from and to the base member (not shown in FIG. 5) but also between the two compartments in the upper region. In the latter case the air flow is entirely within the the cartridge 3' as opposed to the embodiments according to FIGS. 1–4.

In the embodiments according to FIGS. 1–4 compression springs 13 and 14 are arranged in the bottom region of the cartridge 3 for compressing the material in the compartments 5 and 6. In the embodiment according to FIG. 5 the arrangement is reversed in the following way. In the two compartments 5' and 6' fixed bottom means are provided. A movable circular cover 20 is provided in the central circular compartment 5', whereas a movable annular cover 21 is provided in the outer annular compartment 6'. Compression springs 22 and 23 are arranged between the top end of the cartridge 3' and the covers 20 and 21, respectively, for compressing the contents of the compartments 5' and 6'. In a practical case three springs 22 and six springs 23 may be provided.

No description of the contents of the two compartments 5' and 6' is given; in this respect reference is made to the description above of the FIGS. 1–4 embodiments.

What is claimed is:

1. An air drier having a replaceable cartridge, the air drier comprising a base member with means for supplying and carrying away air to and from the cartridge, respectively, a container, releasably attached to the base member, a cartridge inserted into the container, which cartridge is divided by a cylindrical dividing wall into a central compartment, which compartment contains desiccant, and an outer annular compartment, characterized in that the cartridge is provided at its top end with means for allowing only air communication inside the container between the two compartments and at its bottom end with means for allowing supply of air to either of the compartments and removal of air from the other of the compartments, and in that at least the central compartment is provided with individual spring means for compressing the desiccant therein.

2. An air drier according to claim 1, characterized in that the cartridge is provided at its bottom end with means for allowing supply of air to the outer compartment and removal of air from the central compartment.

3. An air drier according to claim 2, characterized in that the outer compartment is substantially desiccant.

4. An air drier according to claim 2, characterized in that the outer compartment in the air supply direction contains a filter and desiccant.

5. An air drier according to claim 3, characterized in that the outer compartment is provided with individual spring means for compressing the desiccant therein.

6. An air drier according to claim 4, characterized in that the desiccant in the outer compartment is different from the desiccant in the central compartment and is active for other molecules than water.

7. An air drier according to claim 5, characterized in that the outer compartment is provided with individual spring means for compressing the desiccant therein.

8. An air drier according to claim 2, characterized in that the outer compartment is substantially filled with a filter.

9. An air drier according to claim 1, characterized in that the cartridge is provided with means at its bottom end for allowing air to the central compartment and removal of air from the outer compartment.

* * * * *